United States Patent [19]
Sekiya et al.

[11] Patent Number: 4,924,672
[45] Date of Patent: May 15, 1990

[54] HEAT EXCHANGER FOR LOWERING TEMPERATURE OF EXHAUST GAS FROM INTERNAL COMBUSTION ENGINE

[75] Inventors: Kazuo Sekiya; Tamotsu Kasuya, both of Oyama, Japan

[73] Assignee: Kabushiki Kaisha Komatsu Seisakusho, Tokyo, Japan

[21] Appl. No.: 591,088

[22] Filed: Mar. 19, 1984

[30] Foreign Application Priority Data

Mar. 23, 1983 [JP] Japan .............................. 58-40676[U]

[51] Int. Cl.$^5$ .............................................. F01N 3/04
[52] U.S. Cl. ........................................ 60/310; 55/246; 55/255; 55/256
[58] Field of Search .................... 60/310; 55/246, 255, 55/256

[56] References Cited

U.S. PATENT DOCUMENTS

| | | | |
|---|---|---|---|
| 2,405,494 | 8/1946 | Dupuy | 60/310 |
| 2,508,297 | 5/1950 | Ruth | 55/255 |
| 2,789,032 | 4/1957 | Bagley | 55/255 |
| 3,566,583 | 3/1971 | Ashmore | 60/310 |
| 3,695,005 | 10/1972 | Yuzawa | 60/310 |
| 3,967,941 | 7/1976 | Terao | 55/255 |

FOREIGN PATENT DOCUMENTS 18256 2/1980 Japan ....................................... 55/255

Primary Examiner—Douglas Hart
Attorney, Agent, or Firm—Armstrong, Nikaido, Marmelstein, Kubovcik & Murray

[57] ABSTRACT

A heat exchanger for lowering the temperature of exhaust gas emitted from an internal combustion engine has a container body adapted to store water which serves a heat exchanging medium therein, an exhaust gas discharging chamber adapted to discharge the exhaust gas from the engine into the water in the form of gas-bubbles, a partition member mounted above the surface of water stored within said container body so as to catch splash of water, water-bubbles and vapor generated by evaporation of water and drop them within the container body; an exhaust gas inlet formed in the peripheral side surface of the container body and connected to exhaust pipe for the engine; an exhaust gas introduction passage for connecting the exhaust gas inlet and the exhaust gas discharging chamber; an exhaust gas exit chamber defined in the uppermost part of the inside of the container body; and an exhaust gas outlet pipe connected to the top of said container body to discharge the exhaust gas within the exhaust gas discharge chamber outside the container body.

3 Claims, 2 Drawing Sheets

HEAT EXCHANGER FOR LOWERING TEMPERATURE OF EXHAUST GAS FROM INTERNAL COMBUSTION ENGINE

BACKGROUND OF THE INVENTION

1. Field of the Invention

This invention relates to a heat exchanger for lowering the temperature of exhaust gas emitted from an internal combustion engine, and more particularly to a heat exchanger for lowering the temperature of exhaust gas emitted from a diesel engine operated at work sites in which pulverized coal or mine dust exists.

2. Description of the Prior Art

Vehicles operated at work sites in which pulverized coal or mine dust exists are required to be designed so as not to form ignition energy sources for mine dust floating in the air. At such work sites, exhaust systems of internal combustion engines, in particular diesel engines tends to form ignition energy sources.

The ignition temperature of pulverized coal is about 190° C. If the pulverized coal is exposed to temperatures more than 190° C., there is a risk that it is ignited to cause explosion of mine dust floating in the surrounding air thus not only injuring or killing workers at the site, but also damaging nearby buildings and facilities etc.

The temperature of exhaust gas discharged from exhaust gas systems of internal combustion engines is normally in the range of 500° to 600° C., and particularly in case of turbocharged engines, the surface temperature of an exhaust manifold at the inlet of the turbocharger reaches to 600° to 700° C. in some cases.

As a method of lowering the surface temperature of exhaust pipes and turbochargers, it has commonly been carried out to use a heat insulating material or to thermally insulate by using water cooled pipings. Whilst, no measure has so far been taken to lower the temperature of exhaust gas because there was no strong requirements for it in the past. However, in order to operate vehicles with diesel engine at work sites in which pulverized coal or mine dust exists without causing any hazard, it is essential to lower the temperature of exhaust gas below 190° C.

SUMMARY OF THE INVENTION

The present invention has been devised in view of the above-mentioned circumstances, and has for its object to provide a heat exchanger for lowering the temperature of exhaust gas emitted from an internal combustion engine so that they can be operated at work site in which pulverized coal or mine dust exists without causing any accident or hazard.

Another object of the present invention is to provide a heat exchanger for lowering the temperature of the exhaust gas emitted from an internal combustion engine arranged to pass the exhaust gas through water to form gas-bubbles within the water thereby dissipating its heat directly into water resulting in lowering the temperature of exhaust gas.

A further object of the present invention is to provide a heat exchanger for lowering the temperature of the exhaust gas emitted from an internal combustion engine which can ensure the recovery of water restored within the main body of the heat exchanger as the heat exchanging medium without scattering it out.

To achieve the above-mentioned objects, according to the present invention, there is provided a heat exchanger for lowering the temperature of exhaust gas emitted from an internal combustion engine, characterized by comprising a container body adapted to store water serving as a heat exchanging medium therein; an exhaust gas discharging chamber adapted to discharge the exhaust gas from the engine into the water in the form of gas-bubbles; a partition member mounted above the surface of water in said container body so as to catch splash of water, water-bubbles and vapour generated by evaporation of water and drop them within the container body; an exhaust gas inlet formed in the peripheral side surface of said container body and connected to the exhaust pipe for the engine; an exhaust gas introduction passage for connecting said exhaust gas inlet and said exhaust gas discharging chamber; an exhaust gas exit chamber defined in the uppermost part of the inside of said container body; and an exhaust gas outlet pipe connected to the top of said container body to discharge the exhaust gas within said exhaust gas exit chamber outside the container body.

Further, according to the present invention, there is provided a heat exchanger for lowering the temperature of the exhaust gas emitted from an internal combustion engine, characterized by comprising further a water reservoir part formed by a downwardly recessed portion of said partition member located under said exhaust gas discharge pipe; a baffle plate mounted between said partition member and the water surface and close to the latter; and a scattered water return pipe, one end of which opens in the bottom surface of said water reservoir part and the other end of which opens in an exhaust gas ascending passage defined between said baffle plate and the inner wall of said container body.

Still further, according to the present invention, there is provided a heat exchanger for lowering the temperature of the exhaust gas emitted from an internal combustion engine characterized in that said partition member comprises a flow regulating plate and a member for preventing water from scattering.

The above and many other advantages, features and additional objects of the present invention will become apparent to those skilled in the art upon making reference to the following detailed description and accompanying drawings in which preferred embodiments incorporating the principles of the present invention are shown by way of illustrative example.

DETAILED DESCRIPTION OF THE PREFERRED EMBODIMENTS

Figure 1:
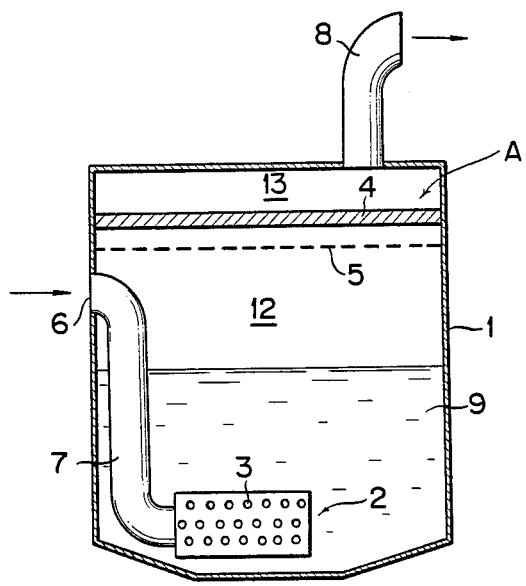
FIG. 1 is a schematic view partly in longitudinal showing the configuration of one embodiment of heat exchanger for lowering the temperature of exhaust gas emitted from an internal combustion engine according to the present invention.

With reference to FIG. 1, one embodiment of heat exchanger for lowering the temperature of the exhaust gas emitted from an internal combustion engine according to the present invention will be described.

In the drawings, reference numeral 1 denotes a container body having an exhaust gas discharging chamber 2 located in the bottom part thereof. The exhaust gas discharging chamber 2 has a great many minute through-holes 3 formed in the peripheral sides thereof. Mounted in the upper part within the container body 1 are a demister 4 and a flow regulating plate 5 which form a partition member "A". The demister 4 is formed by a wire shaped mat made of stainless steel. The container body 1 has an exhaust gas inlet 6 formed in one side thereof. The exhaust gas inlet 6 communicates through an introduction passage such as a pipe 7 with the exhaust gas discharging chamber 2. Further, the exhaust gas inlet 6 is connected to an exhaust pipe (not shown) of an internal combustion engine (not shown). The container body 1 is filled with water indicated by 9 which serves as a heat exchanging medium for cooling to a level corresponding to about half the overall height thereof. An exhaust gas outlet pipe 8 is connected to the top of the container body 1.

The container body 1 is divided by the partition member "A" into an upper space which defines an exhaust gas exit chamber 13 and a lower space which defines a water chamber 12 in which the exhaust gas is introduced.

Thus, the high temperature exhaust gas emitted from an internal combustion engine is introduced through an exhaust pipe (not shown) into the exhaust gas inlet 6 from where the exhaust gas flows through the pipe 7 into the exhaust gas discharge chamber 2 located under water. The exhaust gas forwarded into the exhaust gas discharge chamber 2 is discharged through the aforementioned minute through holes 3 so that it may be formed into numerous gas-bubbles. Such gas-bubbles move upwards through the water by their buoyancy in water and the velocity energy of the exhaust gas flow, while a direct heat exchange is made between the surfaces of the gas-bubbles and the water so that the exhaust gas may be deprived of its heat until it reaches to the water surface. Consequently, the temperature of the exhaust gas which has reached the water surface has been lowered.

The test result obtained by using the heat exchanger of the present invention are summarized in the following TABLE.

As can be seen clearly from the test result shown in this TABLE, in the case where the heat exchanger according to the present invention is used, the exhaust gas temperature at the muffler outlet can be reduced substantially below 190° C., i.e. the ignition temperature of pulverized coal which is the original aim.

To ensure that the effect of lowering the temperature of exhaust gas is achieved by this heat exchanger, it is only necessary to increase the area of contact between the cooling water serving as the heat exchange medium and the exhaust gas. For this reason, it is necessary to reduce the size of the gas-bubbles produced when the exhaust gas is discharged into water as small as possible and diffuse them uniformly in the water.

Figure 2:
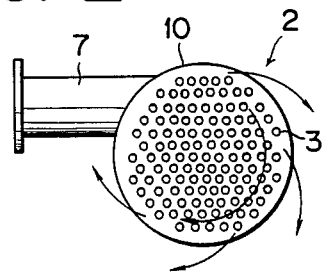
FIG. 2 is a plan view showing another embodiment of the exhaust gas discharging chamber used in the heat exchanger for lowering the temperature of exhaust gas emitted from an internal combustion engine according to the present invention.
Figure 3:
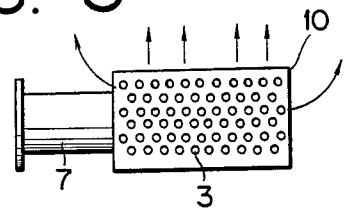
FIG. 3 is a side elevational view of the exhaust gas discharging chamber shown in FIG. 2.

In another embodiment of exhaust gas discharging chamber 2 shown in FIGS. 2 and 3, it comprises a cylindrical body 10 whose diameter is larger than its height and which has a pipe 7 connected thereto so as to allow the exhaust gas to flow along the inner peripheral side wall of the cylindrical body 10. Further, the cylindrical body 10 has minute through-holes 3 formed in the peripheral side surface and the upper surface thereof.

In this exhaust gas discharging chamber, the exhaust gas is allowed to swirl in the cylindrical body 10 and is changed into gas-bubbles when it passes through the through-holes 3 into water. The swirl motion of the exhaust gas enables the gas-bubbles thus produced to be diffused uniformly in the water. Thus, the possible variation in diameter of the gas-bubbles can be eliminated.

When the gas bubbles leave the water surface water droplets are lifted above the water surface by the velocity energy of the gas bubbles. If the water is carried away from the heat exchanger, the amount of water consumption exceeds that of water evaporated by the latent heat, and as a result, the time during which the heat exchanger can be used is reduced thus causing a problem in practical use. However, since the lifted water is usually condensed by the action of the flow regulating plate 5 and the demister and then returned into the container body 1, there is no risk that the above-mentioned problem takes place.

However, under such condition as the engine load was high and the gas had a high energy, the ingress of water droplets into the gas exit chamber was observed. Further, water collected in the gas exit chamber 13 and was discharged together with the exhaust gas flow outside the heat exchanger. It was revealed that the trouble was due to an improper design of the device for returning the water which flowed into the gas exit chamber 13 into the container body 1. Further, in case the heat exchanger for lowering the temperature of

TABLE

| Items | Time Lapsed (Min.) | | | | |
|---|---|---|---|---|---|
| | 0 | 30 | 60 | 90 | 120 |
| Shaft Horsepower | 320 ps/2000 rpm | 319/2000 | 322/2000 | 322/2000 | 319/2000 |
| Exhaust gas temp. at turbine inlet $T_0$ | 592° C. | 615 | 615 | 611 | 607 |
| Exhaust gas temp. at turbine outlet $T_1$ | 491° C. | 535 | 525 | 520 | 512 |
| Exhaust gas temp. at muffler inlet $T_2$ | 472° C. | 504 | 500 | 496 | 490 |
| Exhaust gas temp. at muffler outlet $T_3$ | 47° C | 67 | 65 | 65 | 63 |
| Exhaust gas pressure [mmHg] | 30 | 84 | 77 | 68 | 56 |
| Water level [mm] (Reduction from maximum level) | 0 | −60 | −150 | −240 | −325 | exhaust gas is mounted on a vehicle such as, for example, a bulldozer, if the vehicle tilts, then the surface of the water in the container body 1 also tilts. Therefore, it is necessary to prevent the water in the container body 1 from scattering even under such a tilted condition.

Figure 4:
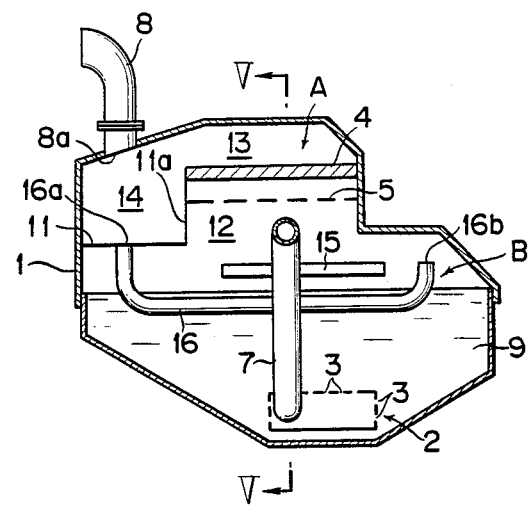
FIG. 4 is a schematic view partly in longitudinal section showing the configuration of another embodiment of heat exchanger for lowering the temperature of exhaust gas emitted from an internal combustion engine according to the present invention.
Figure 5:
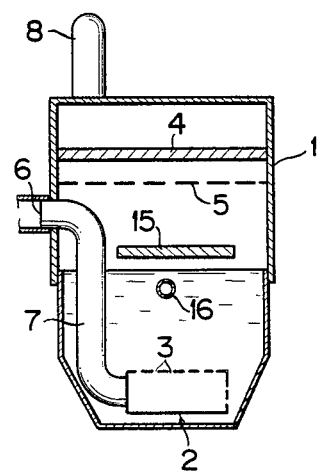
FIG. 5 is a schematic sectional view taken along line V—V in FIG. 4.

In FIGS. 4 and 5, there is shown a further embodiment wherein suitable means is employed to prevent the water from scattering out from the heat exchanger and to recover the water into the container body 1.

In these figures, the component parts equivalent to those of the first embodiment shown in FIG. 1 are denoted by the same reference numerals.

In this embodiment, a part of a partition member "A" located under an exhaust gas outlet 8a of an exhaust gas discharge pipe 8 is formed by a downwardly recessed partition plate 11 which defines a water reservoir part 14.

Further, mounted in the upper part of the gas introduction chamber 12 is a baffle plate 15, one side of which defines a passage B for upwardly flowing gas. A water returning pipe 16 is located so that one end 16a thereof opens in the water reservoir part 14, and the other end 16b thereof opens upwardly along the aforementioned passage B for upwardly flowing gas.

Thus, the exhaust gas which flows from the exhaust gas inlet 6 through the pipe 7 into the gas discharging chamber 2 is discharged into the water in the container body 1 through the minute through-holes 3. The exhaust gas thus discharged into water is freed from entrained water droplets by the member 4 for preventing scattering of water droplets when passing through the latter and then enters the gas exit chamber 13 from where it is discharged through the exhaust gas discharge pipe 8 outside the container body 1.

However, the water droplets are not completely removed by the member 4 and collected in the water reservoir part 14.

In the above-mentioned case, when the exhaust gas discharged from the gas discharging chamber 2 flows upwards through the passage "B" defined on one side of the baffle plate 15, an ejector effect is caused to thereby generate a negative pressure in the return pipe 16 so as to withdraw the water in the water collecting part or reservoir 14 into the container body 1. Consequently, scattering of water droplets outside the container body 1 can be prevented completely.

It is to be understood that the foregoing description is merely illustrative of the preferred embodiment of the present invention, and that the present invention is not to be limited thereto, but is to be limited only by the scope of appended claims.

What we claim is:

1. A heat exchanger for lowering the temperature of exhaust gas emitted from an exhaust pipe of an internal combustion engine comprising a container body for storing water which serves as a heat exchanging medium therein; an exhaust gas discharging chamber for discharging hot gases in the form of gas bubbles into said water in said body and extending partially across said body; a substantially horizontal baffle plate in said container above said water in said container and above said exhaust gas discharge chamber and spaced at one side from the inner side wall of said container and forming a passage for ascending exhaust gas between said one side and said inner side wall for catching and condensing splashes of water, water bubbles and vapor generated by evaporation of water by said hot exhaust gas bubbles and drop said condensed water within the container body; an exhaust gas inlet in the peripheral side surface of said container body and connected to said exhaust pipe of said engine; an exhaust gas introduction passage connecting said exhaust gas inlet to said exhaust gas discharge chamber; an exhaust gas exit chamber in the uppermost part of the inside of said container body above said baffle plate for receiving exhaust gas bubbled through and cooled by said water; and exhaust gas outlet pipe connected to the top of said container body for discharging said exhaust gas cooled by said water to the outside of said container; a water reservoir in said container body formed by a downwardly recessed portion of said exhaust gas exit chamber for receiving said cooled exhaust gas and water droplets entrapped therein and for separating said entrapped water from said cooled exhaust gas; and an entrapped water return pipe, one end of which return pipe opens in the bottom surface of said water reservoir and the other end of which opens in said exhaust gas ascending passage between said baffle plate and the inner wall of said container body.

2. A heat exchanger as claimed in claim 1, in which said exhaust gas discharge chamber comprises a cylindrical body whose diameter is larger than its height and whose exhaust gas introduction passage extends along the circumference thereof, said cylindrical body having a plurality of minute through-holes formed in a peripheral side surface and the upper surface thereof.

3. A heat exchanger as claimed in claim 1 in which said exhaust gas exit chamber includes a flow regulating plate for preventing scattering of water.

* * * * *